April 25, 1961     F. P. BROOKS, JR     2,981,020
ALPHABETICAL READ-OUT DEVICE

Filed Aug. 30, 1956     3 Sheets-Sheet 1

INVENTOR.
FREDERICK P. BROOKS, JR.

BY

ATTORNEY

April 25, 1961     F. P. BROOKS, JR     2,981,020
ALPHABETICAL READ-OUT DEVICE
Filed Aug. 30, 1956     3 Sheets-Sheet 2
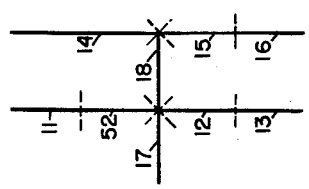
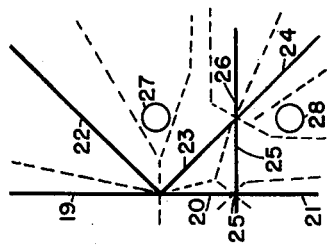
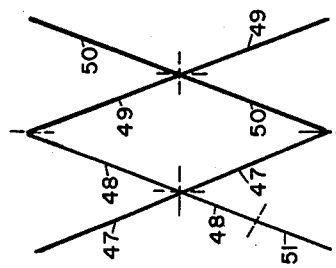
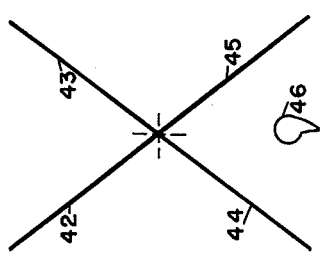
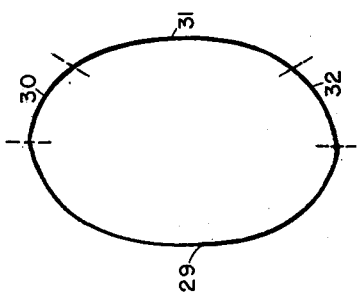
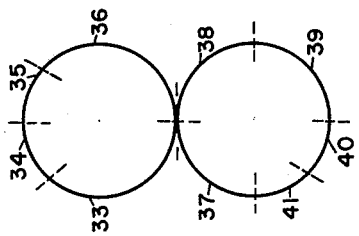
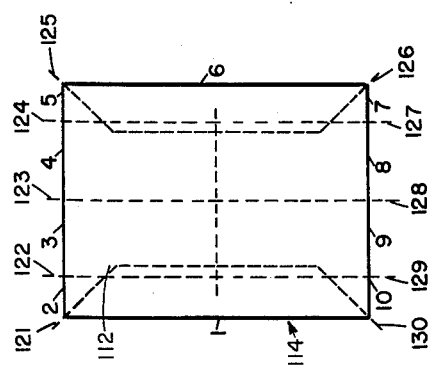
*INVENTOR.*
FREDERICK P. BROOKS, JR.
BY
ATTORNEY April 25, 1961 F. P. BROOKS, JR 2,981,020
ALPHABETICAL READ-OUT DEVICE
Filed Aug. 30, 1956 3 Sheets-Sheet 3

*INVENTOR.*
FREDERICK P. BROOKS, JR
BY
ATTORNEY

United States Patent Office 2,981,020
Patented Apr. 25, 1961

2,981,020

ALPHABETICAL READ-OUT DEVICE

Frederick P. Brooks, Jr., Clinton Corners, N.Y., assignor to North American Aviation, Inc.

Filed Aug. 30, 1956, Ser. No. 607,219

3 Claims. (Cl. 40—130)

This invention relates to display devices and indicators and concerns particularly interchangeable luminous indicators.

An object of the invention is to provide a display device for use in computers or the like which enables the read-out of the computer to be indicated quickly and accurately and with a high degree of legibility.

Numerical read-out devices of the edge-lighted translucent plate type have been proposed which have digits engraved upon them which stand out when the edge of the plate is illuminated. However, it has been difficult to provide an effective indication of information within a reasonable space and with any character to be indicated being interchangeable within the same location with other characters, particularly when the information to be indicated is represented by letters of the alphabet or other characters more numerous than the digits of the decimal system which may be employed where the information constitutes merely a numerical value.

It is accordingly an object of the invention to provide a compact information display device with a plurality of locations in any one of which any desired digit, letter of the alphabet or other character may be caused to appear in luminous form.

A further object of the invention is to provide such apparatus which is readily, quickly and accurately controlled and which is sturdy, durable and reliable.

Other and further objects, features and advantages of the invention will become apparent as the description proceeds.

In carrying out the invention in accordance with a preferred form thereof, in each position in which a digit or letter or other character is to appear, a plurality of translucent plates is provided. They are arranged one behind the other in such a manner that, when engraved lines on any of them are illuminated by edge lighting the plate, the lines stand out from the front of the display device and produce the character. In order that a large number of different characters may be selectively reproduced, each of the plates is divided into areas or fragments with facilities for separately edge-lighting the area and with a segment of a character, such as a letter or digit, engraved on the front surface thereof within a central display area. Various different segments so provided constitute interchangeable components of various letters and digits. In this manner, the number of different character elements required is reduced since many of the character elements may be employed as components in different combinations to produce different characters.

A better understanding of the invention will be afforded by the following detailed description considered in conjunction with the accompanying drawings in which Fig. 1 is a fragmentary perspective view of an embodiment of the invention;

Figure 7:
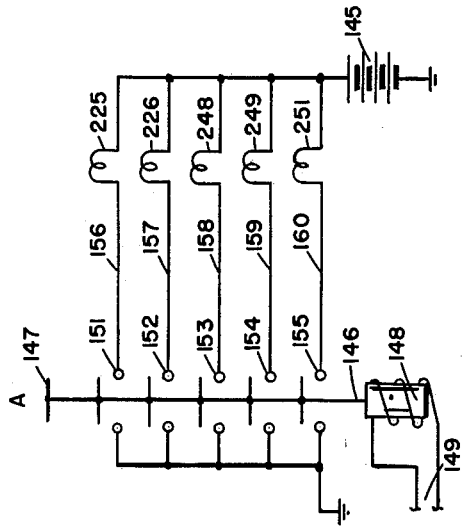
Figure 6:
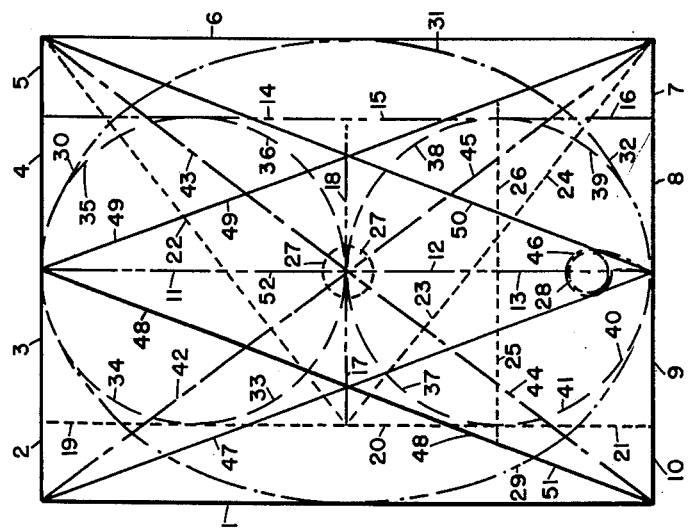

Figs. 5A to 5G, inclusive, are diagrams illustrating the configuration within the display area of the engraved line segments and arrangement of fragments in different edge-lighted plates employed in the apparatus of Figs. 1–4;

Fig. 6 is a diagram illustrating the effect within the display area of the combination of all of the segments illustrated in Fig. 5;

And Fig. 7 is a circuit diagram schematically illustrating the principle of operation of the apparatus of Figs. 1–6.

Like reference characters are utilized throughout the drawings to designate like parts.

Figure 1:
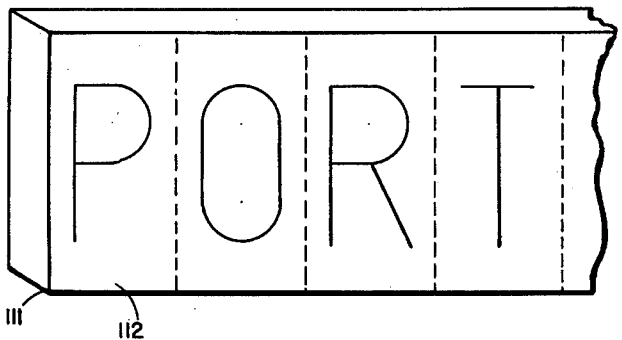
Figure 2:
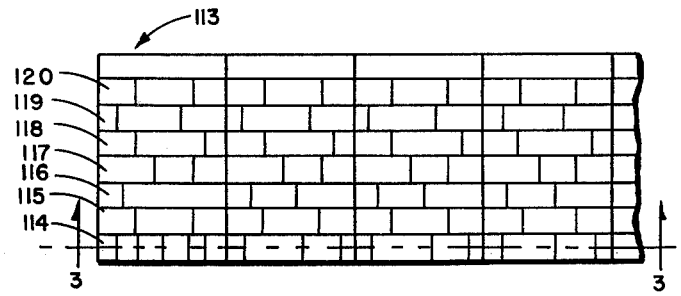
Fig. 2 is a fragmentary view of a horizontal section of the device of Fig. 1, looking in the direction indicated by line 2—2 of Fig. 3.
Figure 3:
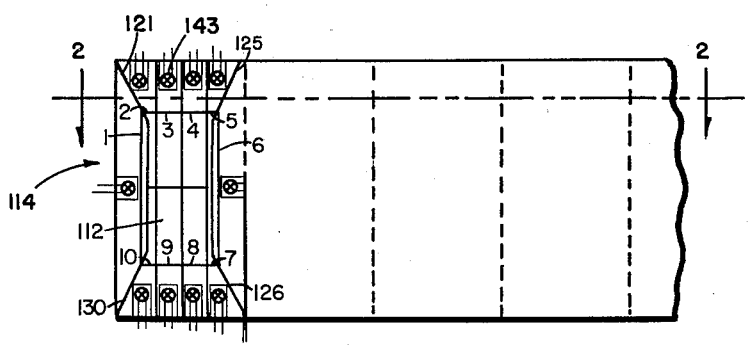
Fig. 3 is a fragmentary view of a vertical section of the device of Fig. 1, looking in the direction indicated by line 2—2 of Fig. 3.
Figure 4:
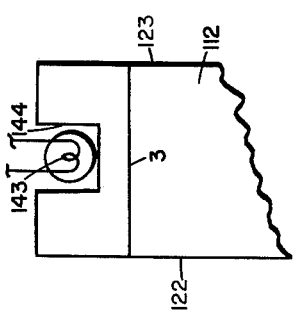
Fig. 4 is a detailed view of one of the fragments or areas of an edge-lighted plate employed in the apparatus of Figs. 1–3.

In the form of apparatus illustrated in Figs. 1–3 a plurality of groups or packs 113 of translucent plates are mounted side-by-side in a housing or cabinet 111 having a front face or surface 112 upon which a signal or information in the form of a group of digits or letters appears to form a number, word or code.

For example as illustrated, the device may be energized to produce the word "PORT" indicating that a ship's helm is to be directed to port. As will become apparent from a consideration of Fig. 2, each pack of plates, such as 113, consists of seven different plates, 114, 115, 116, 117, 118, 119 and 120 in the particular embodiment illustrated. Each of the plates is composed of a suitable translucent material such as polymerized methyl methacrylate, which material is sold under the tradenames of Lucite and Plexiglas. Each of the plates 114—120 in turn is divided into a group of areas or fragments. For example, as illustrated in Fig. 3, the plate 114 is divided into ten fragments, 1–10 inclusive, each with a correspondingly numbered line segment engraved on the front surface thereof. As illustrated in Fig. 5A, the fragments of the plate 114 are cut apart or the plate is otherwise severed along lines 121, 122, 123, 124, 125, 126, 127, 128, 129 and 130, so that the fragments constitute independent plates or plate elements. The edges of the plate elements or fragments along the lines 121 to 130, inclusive, are made opaque by coating with a black paint or the like so that the outer exposed edge of the fragment may be edge illuminated without permitting any light transfer from one fragment to the other.

A separate lamp, such as the lamp 143, is provided for each of the fragments. As illustrated more clearly in Fig. 4 each such lamp 143 may be mounted within a recess 144 formed at the edge of the plate fragment in such a manner that when the lamp 143 is energized the light from the lamp 143 extends longitudinally through the plate fragment and illuminates the line segment which is engraved on the front surface 112 of the plate fragment such as the line segment 3. It is thus apparent that any one of the line segments 1 to 10, inclusive, may be caused to stand out about the central display area as a bright line by energizing any of the lamps, such as the lamp 143 for edge-lighting the fragments of the plate 114.

Similar arrangements are provided for the plates 115–120, inclusive. As shown in Fig. 5A, line segments 1–10 of the plate 114 are arranged along four straight lines to form a rectangular outline or oblong. The other plates have other configurations. For example, the plate 117, the division lines of which are shown in Fig. 5D, has these lines in the configuration of an oval and is divided into four separate fragments including those engraved with a long half oval line 29 and short oval segment lines 30 and 32 and a long ovel segment 31.

As shown in Fig. 5B, the plate 115 is divided into fragments providing line segments 11 to 18, inclusive. As shown in Fig. 5C, plate 116 is divided into fragments providing line segments or linear indicia 19 to 28, inclusive.

The plate 118 illustrated diagrammatically in Fig. 5E provides the various curved line segments 33—41 which together make up the figure eight. Plate 119 shown in Fig. 5F provides line segments 42 to 46, inclusive, and the plate 120 shown in Fig. 5G provides line segments 47 to 51, inclusive.

Since the plates 114 to 120 are translucent and relatively thin, the thickness being exaggerated for clarity in the drawing in Fig. 2, illumination of a light segment in any of the plates appears as an illuminated line at the front surface 112 of the composite device. Therefore, by suitable selection of line segments to be illuminated, any desired character may be caused to appear at any of the positions at the front surface 112 of the unit 111.

Fig. 6 illustrates diagrammatically the result of causing all of the line segments to be illuminated simultaneously. From examination of Fig. 6 it can be seen that by the illumination of only selected line segments any digit or letter of the Roman alphabet may be caused to stand out. It is apparent also that by provision of suitable plate forms other characters may also be produced such as the letters of the Greek alphabet or of the Cyrillic alphabet.

The elements employed to produce the various symbols of the alphabet, digits and punctuation marks and other marks in the illustrative system shown are indicated by the following table:

| Symbol | Elements used | Symbol | Elements used |
| --- | --- | --- | --- |
| A | 25, 26, 48, 49, 51 | 0 | 29, 30, 31, 32 |
| B | 3, 9, 17, 19, 20, 21, 35, 36, 38, 39 | 1 | 3, 8, 9, 11, 12, 13, 52, |
| C | 29, 30, 32 | 2 | 8, 34, 35, 36, 37, 40, 41 |
| D | 3, 9, 19, 20, 21, 30, 31, 32 | 3 | 34, 35, 36, 38, 39, 40 |
| E | 3, 4, 8, 9, 19, 20, 21, 17 | 4 | 11, 12, 13, 25, 26, 48, 52 |
| F | 3, 4, 17, 19, 20, 21 | 5 | 3, 4, 17, 19, 38, 39, 40 |
| G | 18, 29, 39 | 6 | 29, 35, 37, 38, 39, 40, 41 |
| H | 14, 15, 16, 17, 18, 19, 20, 21 | 7 | 3, 4, 5, 50 |
| I | 11, 12, 13, 52 | 8 | 33, 34, 35, 36, 37, 38, 39, 40, 41 |
| J | 14, 15, 16, 39, 40, 41 | 9 | 30, 31, 32, 33, 34, 35, 36, 40 |
| K | 19, 20, 21, 22, 23, 24 | | |
| L | 8, 9, 19, 20, 21 | . | 28 |
| M | 1, 6, 42, 43 | , | 46 |
| N | 1, 6, 42, 45 | : | 27, 28 |
| O | 29, 30, 31, 32 | ; | 27, 46 |
| P | 3, 17, 19, 20, 21, 35, 36 | ? | 12, 28, 34, 35, 36 |
| Q | 29, 30, 31, 32, 24 | ! | 11, 12, 52, 28 |
| R | 19, 20, 21, 3, 35, 36, 17, 23, 24 | / | 43, 44 |
| S | 33, 34, 35, 38, 39, 40 | $ | 11, 52, 12, 13, 34, 35, 38, 39, 40 |
| T | 2, 3, 4, 5, 11, 12, 13, 52 | — | 17, 18 |
| U | 14, 15, 19, 20, 39, 40, 41 | + | 12, 52, 17, 18 |
| V | 47, 50 | = | 17, 18, 25, 26 |
| W | 1, 6, 44, 45 | • | 27 |
| X | 42, 43, 44, 45 | ≤ | 22, 25, 26, 17, 18 |
| Y | 12, 13, 42, 43 | | |
| Z | 2, 3, 4, 5, 7, 8, 9, 10, 43, 44 | | |

Any suitable means may be provided for selectively energizing the requisite lamps. For simplicity, there has been shown in Fig. 7 a push button or solenoid type of mechanical multicontact switch for producing the letter A, it being understood that other like switches with suitable contact connections of the required lamp or switches of some other type such as electronic would be provided for each of the other symbols or characters. For simplicity, however, only connections for the letter A have been shown.

There is a source 145 of electrical current for energizing the lamps. A multi-contact switch 146 is provided having, if desired, an actuating push button 147 marked with the letter A for convenience, and a solenoid 148 with control windings 149 arranged for connection to a circuit (not shown) responsive to a computer or other device which has produced the signal when the letter A is to be indicated. Five line segments are employed for the letter A and, accordingly, the switch 146 includes five sets of contacts 151, 152, 153, 154 and 155. Parallel conductors 156, 157, 158, 159 and 160 are connected across the current source 145 in series with lamps 225, 226, 248, 249 and 251, which serve to illuminate line segments 25, 26, 48, 49 and 51, respectively. Thus, line segments indicated in the foregoing table serve upon illumination to form the symbol or character A.

When it is desired to produce the illuminated letter A in the device 111, either the push button 147 is depressed or the solenoid 148 is energized. In the similar manner, when any other symbol is to be indicated, corresponding suitable circuits to suitable lamps are energized to produce the desired symbol.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A digital information display device comprising the combination of a plurality of plates each of which is cut into a plurality of coplanar fragments, each with a separate character element therein, each with independent illuminating means at the edge thereof, the confronting edges of the fragments being opaque to prevent transmission of light from one fragment to another to provide independent control of character element illumination of different fragments.

2. In a digital information display device an edge-lighted translucent plate comprising a plurality of coplanar fragments with adjacent edges contiguous and such contiguous edges being opaque, each fragment having a separate character element thereon and each having an independent illuminating means at an edge thereof other than the opaque edge, the opaque contiguous edges preventing transmission of light from one fragment to another to provide independent control of character illumination in different fragments.

3. A digital information display device comprising in combination, a plurality of translucent plates adapted to be edge-lighted, each having a surface with a plurality of elements of separate characters engraved upon it, said elements of separate characters, of at least one of said plates, adapted to be selectively illuminated, said plates being mounted parallel whereby all illuminated character elements are visible simultaneously to produce a complete character and means for selectively illuminating separate character elements on separate ones of said plates required to produce a desired character.

References Cited in the file of this patent

UNITED STATES PATENTS

| | | |
| --- | --- | --- |
| 2,251,861 | Willer | Aug. 5, 1941 |
| 2,619,068 | Malheiras | Nov. 25, 1952 |
| 2,722,762 | Krajian | Nov. 8, 1955 |
| 2,751,584 | Isborn | June 19, 1956 |
| 2,766,447 | Woodson et al. | Oct. 9, 1956 |